United States Patent Office 3,446,824
Patented May 27, 1969

3,446,824
DIRECT PROCESS FOR THE PREPARATION OF ORGANOGERMANIUM HALIDES
Kurt Moedritzer, Webster Groves, Mo., assignor to Monsanto Company, St. Louis, Mo., a corporation of Delaware
No Drawing. Filed Dec. 10, 1965, Ser. No. 513,114
Int. Cl. C07f 7/00
U.S. Cl. 260—429    14 Claims

ABSTRACT OF THE DISCLOSURE

The present invention relates to the preparation of organogermanium halides. The process of the invention comprises the contacting of elemental particulate germanium with a gaseous hydrocarbyl halide.

---

The present invention relates to the preparation of certain organogermanium halides. It is an object of the invention to provide an improved method for the preparation of such compounds whereby improved yields are obtained in comparison to known methods. It is also an object of the invention to provide a continuous process operating with sustained high yields to produce organogermanium halides.

It has been found that the preparation of the various organogermanium halides, for example, the hydrocarbylgermanium halides having from 1 to 20 carbon atoms in the hydrocarbyl radical, such as saturated and unsaturated alkyl and cycloalkyl radicals having from 1 to 20 carbon atoms, and phenyl and substituted phenyl radicals having from 6 to 20 carbon atoms, and with the halides being selected from the class consisting of fluorine, chlorine, bromine and iodine is readily accomplished by the present method. Typical alkyl radicals coming within the scope of the present invention include methyl, ethyl, propyl, butyl, pentyl, hexyl, heptyl, octyl, nonyl, decyl, undecyl, dodecyl and up to eicosyl radicals as straight chain, branched, saturated and unsaturated homologues, while typical aryl radicals include phenyl, tolyl, xylyl and naphthyl radicals as well as substituted aryl radicals, such as the ethylphenyl radical. Such alkyl and aryl moieties are designated herein as hydrocarbyl radicals.

It has been found that certain procedural steps improve the preparation of hydrocarbylgermanium halides, specifically dihydrocarbylgermanium dihalide and hydrocarbylgermanium trihalide. The improved process employs germanium in metallic particulate form, disposed in a packed tower, which is reacted with the desired hydrocarbyl halide to provide the ultimate hydrocarbylgermanium halides. The use of a packed, vertical tower with continuous or intermittent addition of the particulate germanium, with catalysts and diluents, makes it feasible to operate the process continuously. The organic halide is supplied in vapor form (or as a liquid which is vaporized in the reactor), while the products are withdrawn as liquids. However, it has been found that the use of elemental, metallic germanium requires that the particle size of the germanium be quite small, namely 1 micron to 100 microns particle size. For example, the use of a germanium powder having an average particle size of 50 microns gives a yield of 3 grams of crude reaction product per hour in the practice of the present invention, while in contrast the use of commercial germanium powder, of about 1,000 to 50,000 microns particle size, under the same reaction conditions, gives a yield of only 0.06 gram of crude reaction products per hour.

The use of the elemental particular germanium is improved by the employment of a catalyst such as metallic copper, silver or platinum. The particle size of the catalyst, for example copper, is not critical so that any convenient particle size may be used. However, for ease of handling, and to avoid metal segregation, a particle size similar to that of the germanium as discussed above is desirable.

Another procedural improvement which has been discovered to aid in the preparation of hydrocarbylgermanium halides is to introduce the hydrocarbyl halide for example, methyl chloride when producing dimethylgermanium dichloride and methylgermanium trichloride, at a specific rate of addition. Such rate of addition should be in the range of 3 millimoles per minute per sq. cm. of cross section of the packed bed of germanium powder, diluent and catalyst to 6 millimoles per minute per sq. cm. of cross section. As an example, the total charge of the packed bed consists of about 62 weight percent of germanium, and 28 weight percent of copper powder, and with a diluent of about 10 weight percent of glass wool (or asbestos as fibers or flakes). The diluent such as glass wool which is preferably uniformly mixed with the metal powder prevents sintering or caking of the metals.

The proportions of the germanium reactant and the catalytic metal such as copper, silver, or platinum are not critical although it has been found convenient to employ from 1% to 50% by weight of the catalytic metal, based upon the weight of the total charge. The proportion of the diluent spacing material is also not critical, but is preferably used in the proportion of from 5% to 50% by weight based upon the total charge to the reaction column.

The general conditions for carrying out the present process include the temperature range of 300° C. to 450° C. The pressure is not a critical variable, so that vacuum, atmospheric or superatmospheric conditions may be employed.

The following examples illustrate specific embodiments of the present invention.

Example 1

The preparation of monomethylgermanium trichloride, $CH_3GeCl_3$, and dimethylgermanium dichloride, $$(CH_3)_2GeCl_2$$

is carried out by introducing 100 grams of germanium (1.42 gram atoms) and 40 grams of copper (0.63 gram atom), each as particulate materials having an average particle size of about 20–50 microns. The intimate mixture of the metal powders is distributed on a mass of glass wool disposed in a 25 millimeter inner diameter Pyrex tube as the reactor. The central portion of a 50 centimeter long reactor tube is heated to a temperature of 400° C. plus or minus 10° C., by locating the tube in a 30 centimeter tube furnace. The methyl chloride reactant is introducted at the rate of 80 cc. per minute per sq. cm. of cross section area of the column (3.6 millimoles per minute per sq. cm. of cross section area of the column), with this reactant being introduced as a gas. The resulting liquid product leaving the reactor at a rate of 3 grams of crude material per hour per sq. cm. of cross section area of the column is collected in a flask, and the gaseous products are separated in a Dry Ice trap. The liquid materials are purified by fractionation through a 100 centimeter heated column packed with glass helices. The products are $CH_3GeCl_3$, with a boiling point of 111° C. at 750 millimeters, obtained in a yield of 20% (mol) and $(CH_3)_2GeCl_2$, B.P. 122° C., in 60% (mol) yield.

In this example and the other examples discussed herein, the crude reaction products are assayed by proton nuclear-magnetic-resonance (n.m.r.) spectroscopy of the neat liquids. In this work the chemical shifts observed are summarized as follows (p.p.m. relative to tetramethylsilane):

| | |
|---|---|
| $CH_3Cl$ | −2.950 |
| $CH_3GeCl_3$ | −1.667 |
| $(CH_3)_2GeCl_2$ | −1.183 |
| $(CH_3)_3GeCl$ | −0.667 |
| $CH_3Br$ | −2.575 |
| $CH_3GeBr_3$ | −2.067 |
| $(CH_3)_2GeBr_2$ | −1.458 |
| $(CH_3)_3GeBr$ | −0.816 |
| $CH_3I$ | −2.117 |
| $CH_3GeI_3$ | −2.800 |
| $(CH_3)_2GeI_2$ | −1.900 |
| $(CH_3)_3GeI$ | −1.033 |

Example 2

The procedure of Example 1 is employed to produce methylgermanium tribromide and dimethylgermanium dibromide by charging gaseous methyl bromide at a flow rate of 100 cc. per minute per sq. cm. of cross section area of the column (4.4 millimoles per minute per sq. cm. of cross section area of the column). The product leaves the reactor at a rate of 13.2 grams per hour per sq. cm. of cross section area of the column. The dimethylgermanium dibromide has a boiling point of 153° C. at 750 millimeters, and is obtained in 43 mol percent yield. The product $CH_3GeBr_3$ has a boiling point of 170° C. at 750 millimeters and is obtained in 40 mol percent yield.

Example 3

The preparation of dimethylgermanium diiodide and methylgermanium triiodide is conducted using the procedure of Example 1 but charging methyl iodide as a vaporized liquid introduced at the liquid flow rate of 0.2 cc. per minute per sq. cm. of cross section area of the column, equivalent to a gaseous flow rate of 3.2 millimoles per minute per sq. cm. of cross section area of the column. The product leaves the reactor at a rate of 13 grams per hour per sq. cm. of cross section area of the column. The product, $(CH_3)_2GeI_2$, obtained in 25% (mol) yield has a boiling point of 62–64° C. at 2 millimeters, and $CH_3GeI_3$ obtained in 33% (mol) yield boiling at 83–85° C. at 2 millimeters.

Example 4

The preparation of n-propylgermanium fluorides is carried out using the procedure of Example 1 but with a column packing of 75% (wt.) germanium (25–75 micron particle size), 10% silver (25–75 micron particle size) and 15% shredded asbestos fibers, and with n-propyl fluoride being fed as a gas to the reaction zone at a flow rate corresponding to 100 cc. per minute sq. cm. of cross section area of the column (equivalent to 4.4 millimoles per minute per sq. cm. of cross section area of the column). The crude product is obtained at a rate of 3 grams per hour per sq. cm. of cross section area of the column. The products have the properties: $(C_3H_7)_2GeF_2$, B.P. 183° C.; $C_3H_7GeF_3$, B.P. 147° C. at 760 millimeters. The individual components ore separated by fractional distillation.

Example 5

In order to show the importance of the flow rate, the procedure of Example 1 is modified by reducing the flow rate to about 10 cc. per minute per sq. cm. of cross section area of the column (0.44 millimole per minute per sq. cm. of cross section area of the column). It is found that the yield per hour is reduced to about 0.1 gram of crude reaction product per hour per sq. cm. of cross section of the reaction tube, with the reaction product consisting of $CH_3GeCl_3$ and $(CH_3)_2GeCl_2$ in the same proportions as in Example 1.

Example 6

In order to show the effect of particle size of the reactant germanium, the procedure of Example 1 is modified by using crude, ground, lump germanium, with a particle size of about 1000 toi 50,000 microns. The yield is only 0.06 gram of crude reaction product per hour per sq. cm. of cross section of the reaction tube, in contrast to the yield of 3 grams per hour per sq. cm. of cross section of the reaction tube as described in Example 1 using 20 to 50 micron size particles of germanium.

The above examples illustrate the improvement brought about by the modifications defined herein. Note, for instance, Examples 5 and 1 showing an improvement in the yield per hour per sq. cm. of cross section area of the column by a factor of about 30 in the use of the critical flow rate of the hydrocarbyl halide. Examples 6 and 1 show a 50 fold increase in yield per hour sq. cm. of cross section area of the column in the employment of the critical particle size of the germanium powder.

The process defined herein may also be carried out by employing a germanium-copper alloy consisting of 5–50% of copper, with the alloy being applied in the particle size from 1 to 100 microns.

What is claimed is:

1. Process for the preparation of a mixture of hydrocarbylgermanium dihalide and hydrocarbylgermanium trihalide in high yield, which comprises contacting a packed column essentially containing elemental, particulate germanium having a particle size of 1 micron to 100 microns with a gaseous hydrocarbyl halide being supplied to the said packed column at the rate of from 3 to 6 millimoles per minute per sq. cm. of cross section area of the said packed column.

2. Process for the preparation of hydrocarbylgermanium halides in high yield which comprises contacting a packed column essentially containing elemental, particulate germanium having a particle size of 1 micron to 100 microns with a gaseous hydrocarbyl halide being supplied to the said packed column at the rate of from 3 to 6 millimoles per minute per sq. cm. of cross section area of the said packed column and recovering the product from the reaction mixture.

3. Process as in claim 1, in which the hydrocarbyl halide is methyl chloride, and the products obtained are monomethylgermanium trichloride and dimethylgermanium dichloride.

4. Process as in claim 1, in which the hydrocarbyl halide is methyl bromide, and the products obtained are monomethylgermanium tribromide and dimethyl germanium dibromide.

5. Process as in claim 1, in which the hydrocarbyl halide is methyl iodide, and the products obtained are monomethylgermanium triiodide and dimethylgermanium diiodide.

6. Process as in claim 1 in which the hydrocarbyl halide is propyl fluoride, and the products obtained are mono-n-propylgermanium trifluoride and di-n-propylgermanum difluoride.

7. Process as in claim 2, in which the hydrocarbyl halide is methyl chloride, and the product obtained is monomethylgermanium chloride.

8. Process as in claim 2, in which the hydrocarbyl halide is methyl bromide, and the product obtained is monomethylgermanium bromide.

9. Process as in claim 2, in which the hydrocarbyl halide is methyl iodide, and the product obtained in monomethylgermanium iodide.

10. Process as in claim 2, in which the hydrocarbyl halide is propyl fluoride and the product obtained is monopropylgermanium fluoride.

11. Process as in claim 2, in which the hydrocarbyl halide is methyl chloride, and the product obtained is dimethylgermanium dichloride.

12. Process as in claim 2, in which the hydrocarbyl halide is methyl bromide, and the product obtained is dimethylgermanium dibromide.

13. Process as in claim 2, in which the hydrocarbyl halide is methyl iodide, and the product obtained is dimethylgermanium diiodide.

14. Process as in claim 2, in which the hydrocarbyl halide is propyl fluoride and the product obtained is dipropylgermanium difluoride.

References Cited

UNITED STATES PATENTS

| | | | |
|---|---|---|---|
| 1,639,947 | 8/1927 | Kraus et al. | 260—429 |
| 2,444,270 | 6/1948 | Rochow | 260—429 |

OTHER REFERENCES

Rochow: J. Am. Chem. Soc., 72 (1950), p. 198.

TOBIAS E. LEVOW, *Primary Examiner.*

A. P. DEMERS, *Assistant Examiner.*

PO-1050
(5/69)

UNITED STATES PATENT OFFICE
CERTIFICATE OF CORRECTION

Patent No. 3,446,824          Dated May 27, 1969

Inventor(s) Kurt Moedritzer

It is certified that error appears in the above-identified patent and that said Letters Patent are hereby corrected as shown below:

Column 2, line 8, "particular" should read -- particulate --.

Column 3, line 1, "ducted" should read -- duced --.

Column 3, line 70, after "per minute" should be inserted -- per --.

Column 4, line 2, "ore" should be -- are --.

Column 4, line 21, "toi" should read -- to --.

Column 4, line 33, after "per hour" should be inserted -- per --.

Column 4, line 74, "manum" should be -- manium --.

Column 5, line 7, "obtained in" should be -- obtained is --.

SIGNED AND SEALED
JUN 9 1970

(SEAL)
Attest:

Edward M. Fletcher, Jr.
Attesting Officer

WILLIAM E. SCHUYLER, JR.
Commissioner of Patents